Figure 1:
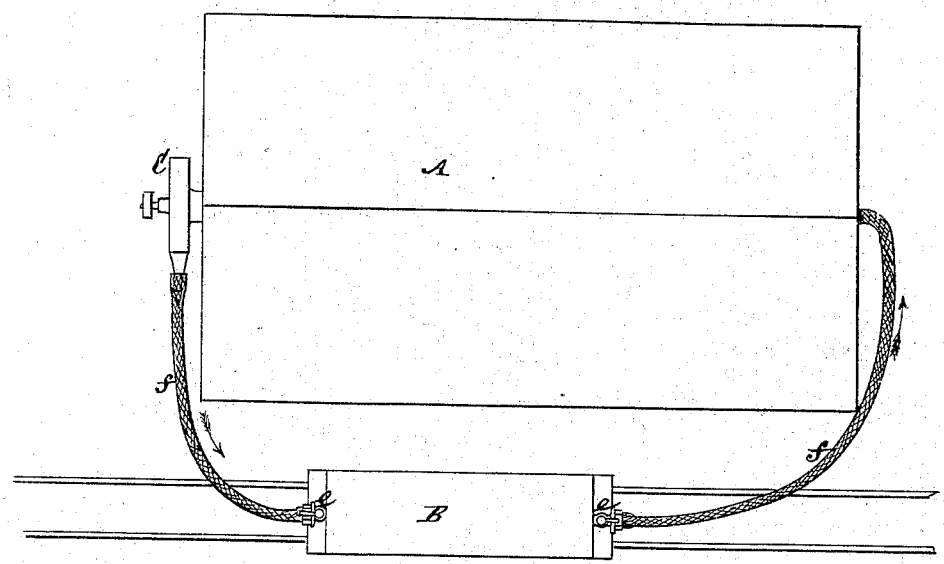

C. J. EVERETT.
PROCESS OF PRESERVING ANIMAL AND VEGETABLE SUBSTANCES DURING TRANSPORTATION.

No. 182,426. Patented Sept. 19, 1876.

UNITED STATES PATENT OFFICE.

CHARLES J. EVERETT, OF TENAFLY, NEW JERSEY, ASSIGNOR TO HIMSELF AND RADCLIFFE B. LOCKWOOD, OF BOULDER, COLORADO.

IMPROVEMENT IN PROCESSES OF PRESERVING ANIMAL AND VEGETABLE SUBSTANCES DURING TRANSPORTATION.

Specification forming part of Letters Patent No. 182,426, dated September 19, 1876; application filed August 2, 1876.

*To all whom it may concern:*

Be it known that I, CHARLES J. EVERETT, of Tenafly, in the county of Bergen and State of New Jersey, have invented a new and useful Improvement in the Preservation of Animal and Vegetable Substances; and I do hereby declare that the following is a full, clear, and exact description of the same, reference being had to the accompanying drawing, which forms part of this specification.

This invention relates more particularly to the preservation of animal and vegetable substances during transportation from one place to another, without the use of ice or other refrigerating material during such transportation.

The following preliminary remarks will serve to explain more fully the objects and value of my invention.

Animal and vegetable substances of a perishable character are often produced in large quantities in localities distant one or more days' travel by railroad, or other system of conveyance, from extensive markets, or other places of consumption. Heretofore it has been usual, during warm weather, to transport such perishable substances in railway-cars, vessels, or wagons by inclosing them in a non-conducting chamber, and surrounding them by atmospheric air, kept constantly cool or at a low temperature by means of ice, or other refrigerating material, or by chemical compounds or processes. But all these previous methods involve the continuous use, proximity to the substance being preserved, and waste of large quantities of ice or cooling chemical substances, or the active continuance of the cooling processes heretofore practiced during such transportation. Furthermore, most, if not all, of such previous methods require frequent if not continuous currents of such artificially-cooled air to pass over and around the perishable substances intended to be preserved. If these air-currents are induced for the purpose of ventilation, and to remove strong odors or foul gases, it is customary to keep up a continuous circulation by fresh quantities of atmospheric air passed into and through the chamber where the perishable substances are confined. This is not only wasteful of the ice or other refrigerating material, but is otherwise objectionable. On the other hand, when the same confined air is constantly circulated through the chamber containing the substances to be preserved, it is found, in practice, that by frequent deposition of the natural moisture of the air on the colder surfaces of the ice, or of the ice-box, or of other refrigerating medium, that that abnormally dry air extracts from the animal or vegetable substances their moisture, and with it much of the characteristic flavor of said substances. Furthermore, it is obvious that when the low temperature of a refrigerating-car or other vehicle or vessel is maintained by any of the customary or hereinbefore-described processes, a large portion of the carrying capacity of the car or vehicle is occupied by the refrigerating material, or apparatus used to carry on the refrigerating process, thus adding so much dead weight to the vehicle, and reducing the space available to the meat, fruit, or other substance to be preserved.

If the animal or vegetable substances to be transported during warm weather should simply first be cooled down in an ice-house to the lowest temperature which they will safely bear, and be then quickly placed in a car constructed with non-conducting walls, but the inside temperature of which is much higher than that of the ice-house, it is evident that the heat of the contained air and of the interior sides of the car would soon raise the temperature of the cooled contents to an unsafe or prejudicial degree, so that some method of renewed or additional refrigeration must be adopted after the car is filled and closed.

My invention obviates these difficulties, and its object is to simplify and economize the preservation of animal and vegetable substances of a perishable character, during comparatively short periods of time. It is alike applicable, by merely substituting a furnace or heater for an ice-house, to preserving said substances from freezing during winter as from decay during warm weather.

My invention consists in confining the substances to be preserved in an air-tight car, or other vehicle or chamber, having non-conducting walls, and then making a temporary communication between such vehicle or chamber and an ice-house or a heater, accordingly as it is required to cool or heat the vehicle or chamber, till the latter and its contents reach or approximate the same temperature as the ice-house or heater, by means of either a natural or artificial or induced circulation kept up between the car or preserving-chamber and ice-house or heater during their connection, after which said connection is severed, and external air excluded from entering the car or preserving-chamber, which maintains its modified temperature by reason of the non-conducting character of its construction. Chemical absorbents or disinfectants may also be used to advantage within the car in combination with this process.

Figure 2:
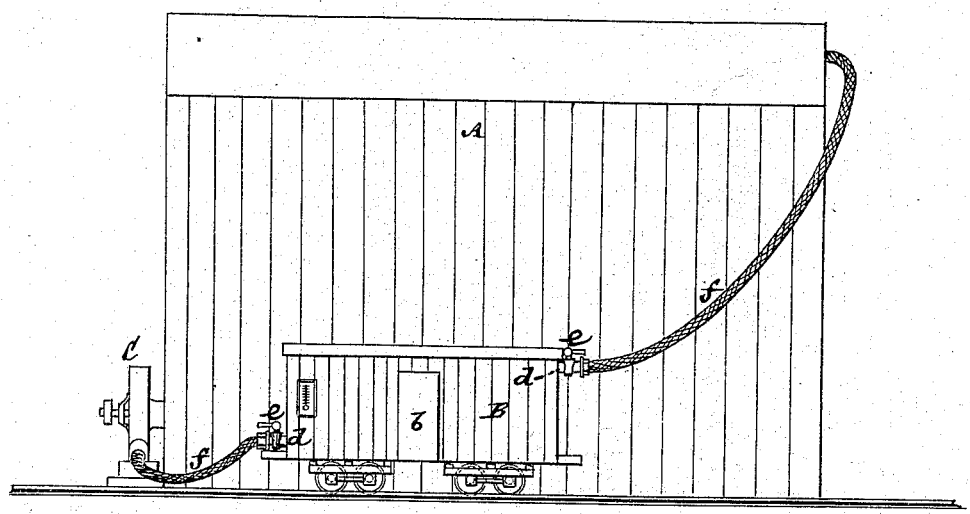

In the drawing, Figure 1 represents a plan of certain means used to illustrate my improved process, as applied to the preservation of perishable animal or vegetable substances during their transportation by railroad, and the same will here, mainly, be described as adapted to warm weather. Fig. 2 is a side elevation of the same.

At the place of production or collection of large quantities of perishable animal or vegetable substances I propose to construct one or more houses or other receptacles, A, for the storage of moderate quantities of ice. If on the line of a railroad, close air-tight cars will be prepared as follows:

The sides, ends, tops, and floors of the car B are double, with intervening spaces, which are filled with any good non-conducting material. Said car has but one door, b, for ingress and egress, which door is constructed so that when closed all circulation of air to or from the interior of the car entirely ceases. At either end of the car, say, at the upper part of one end and at the lower part of the other end, are air-pipes d, of three or four inches diameter, more or less, opening into the outer air, and communicating with the interior of the car. These pipes are provided with air-tight valves e e to exclude the outer air, and with screw-threads or other suitable means for connecting thereto flexible pipes or hose f f, which may be of the same diameter as the pipes, and which are made to communicate with the ice-depot or storehouse A before mentioned. The hose is connected with a fan-blower, air-pump, or other device C for forcing or drawing the cold air from the ice-house into the car at one end, while the warmer air previously contained in the car flows from the other end back into the ice-house, to be there cooled and again forced into and through the car.

The same effect—that is, the cooling to the required temperature of the contained air of the car—may be effected automatically by using larger pipes, and so connecting them with the ice-house that the colder and heavier air of the ice-house will flow continually, though more slowly, into the lower part of the car, and force the warm and lighter air of the car upward. A thermometer is placed in the car, visible through a glass window, to enable the operator to see when the required temperature is attained.

The car and the requisite connections with the ice-house, hereinbefore described, having been prepared, and a quantity of meat, fish, fruit, or other animal or vegetable substances having been accumulated at, in, or near the ice-house, the same is placed in the car, the door of the latter tightly closed, the temporary communication with the ice-house effected, and the cold air forced or drawn through the car until the thermometer shows that the requisite temperature has been attained by the contained air and contents of the car. The valves of the air-pipes are then closed, and the hose-pipes disconnected. The car is then ready to proceed on its journey, and need not have its interior again exposed to the outside atmosphere until the car has arrived at its destination for distribution of its contents, or certain of them.

When economy is not so much of an object as expedition, and the perishable substances to be preserved and to be transported are stored in the ice-house, temporary connection may be made between the car door and the door of the ice-house, the air-pipe connection made, and, as soon as the loading of the car is commenced, the circulation of the cooled air is also begun, so that by the time the car is filled the interior of the car and its contents will have been cooled down to the requisite temperature. This mode of carrying out the process, although more wasteful, allows the displaced warm air of the car to escape into the outer air, and to be replaced by the cooled air from the ice-house.

When it is required to transport the contents of the car an unusually prolonged distance for such a system of preservation, and to maintain the low temperature for a proportionately-extended period of time, it will be necessary to repeat the process hereinbefore described of cooling the car as often as the thermometer in the car indicates the approach of too high a temperature within the car. If it is desired to transport the substances to be preserved several days' journey, ice-depots should be constructed at distances apart equal to one or two days' travel, with sidings or switches alongside the main track, upon which the cars may be run and the operation herein described repeated.

To adapt the process to the preservation of animal or vegetable substances from freezing or being injured by cold in the winter season, it is only necessary to substitute a furnace or heater for the ice-house to elevate the temperature of the contained air of the car to a degree which will have the desired effect upon the contents of the car, at least for a short period of time or during transportation, the same means and mode of operation being resorted to as in cooling the car for transportation during warm weather.

When the substances to be preserved are such as emit strong odors or offensive gases during their confinement in the air-tight car or chamber, I introduce dry vegetable carbon or any other inodorous absorbent or suitable disinfectant for the purpose of absorbing or neutralizing such odors or gases as fast as they are generated.

I do not limit the application of my process to any specific form or kind of car, chamber, or package for the purpose of receiving and transporting the substances to be preserved, so long as such car, chamber, or package is air-tight when closed, and has walls of a non-conducting character; nor do I confine myself to any specific means of cooling or heating the air to be supplied to the car or chamber, as there are many well-known modes of accomplishing either result.

I claim—

The process herein described of preserving animal or vegetable substances during transportation by confining them in an air-tight car or other vehicle or chamber, having its walls built to obstruct the passage of heat, and then making temporary communication between such vehicle or chamber and an ice-house or heater, and establishing circulation between either of the latter and the vehicle or preserving-chamber, and subsequently severing such communication, and excluding the external air from the interior of the car or chamber, substantially as specified.

CHAS. J. EVERETT.

Witnesses:
HENRY T. BROWN,
FRED. HAYNES.